United States Patent [19]

O'Toole

[11] Patent Number: 5,354,801

[45] Date of Patent: Oct. 11, 1994

[54] PROCESS FOR PRODUCING SMALL POLYMER PHASE DROPLET MICROEMULSIONS BY MULTISTEP AQUEOUS PHASE ADDITION

[75] Inventor: Michael P. O'Toole, Norwalk, Conn.

[73] Assignee: Cytec Technology Corp., Wilmington, Del.

[21] Appl. No.: 105,266

[22] Filed: Aug. 12, 1993

[51] Int. Cl.$^5$ .............................................. C08F 2/32
[52] U.S. Cl. ................... 524/461; 524/535; 524/529; 524/801
[58] Field of Search ............... 524/801, 827, 829, 831, 524/461, 535, 529

[56] References Cited

U.S. PATENT DOCUMENTS

| | | | |
|---|---|---|---|
| 3,297,621 | 1/1967 | Taft | 260/29.6 |
| 4,521,317 | 6/1985 | Candau et al. | 252/8.55 |
| 4,681,912 | 7/1987 | Durand et al. | 524/827 |
| 4,954,538 | 9/1990 | Dauplaise et al. | 523/223 |
| 4,968,435 | 11/1990 | Neff et al. | 210/734 |
| 5,110,864 | 5/1992 | Robinsion et al. | 524/801 |

FOREIGN PATENT DOCUMENTS 0462365 12/1991 European Pat. Off. .... D21H 21/54

OTHER PUBLICATIONS

Naidus, "Emulsion Polymers for Paints," Industrial and Engineering Chemistry, vol. 45, No. 4, pp. 712–717 (Apr. 1953).
Rohm and Haas, "Emulsion Polymerization of Acrylic Monomers," pp. 7, 14–18.
C. Holtzscherer, S. Candau, and F. Candau in K. L. Mittal and P. Bothorel, eds., Surfactants in Solution, in press.
Holtzscherer et al., "Application of the Cohesive Energey Ratio Concept (CER) to the Formation of Polymerizable Microemulsions," Colloids and Surfaces, 29, (1988) 411–423.
Holtzscherer et al., "Modification of Polyacrylamide Microlatices by Using a Seeding Procedure," Institut Charles Sadron, pp. 1473–1481.
Morgan, "Multifeed Emulsion Polymers: The Effects of Monomer Feed Sequence and the Use of Seed Emulsion Polymers," J. App. Poly. Sci., vol. 27, 2033–2042 (1982).

Primary Examiner—Joseph L. Schofer
Assistant Examiner—Jeffrey T. Smith
Attorney, Agent, or Firm—Frank M. Van Riet

[57] ABSTRACT

A novel method for producing compositions comprising polymeric solution droplets is disclosed. The products are useful as retention aids in paper pulps, as flocculating agents for flocculating a wide variety of dispersions of suspended solids and as drive fluids for use in oil recovery.

9 Claims, No Drawings

PROCESS FOR PRODUCING SMALL POLYMER PHASE DROPLET MICROEMULSIONS BY MULTISTEP AQUEOUS PHASE ADDITION

The present invention relates to a method for preparing anionic, cationic or non-ionic polymeric microemulsions by a multi-step process to achieve small sized aqueous phase droplets by more efficient use of emulsifier. The present invention also relates to the use of the polymeric microemulsions in papermaking as a retention aid, in solid-liquid separation as a flocculant, and in enhanced oil recovery as a drive fluid with improved performance.

BACKGROUND OF THE PRESENT INVENTION

Polymerization of monomers in microemulsions is known to those skilled in the art. They are stable, transparent water-in-oil systems that are stabilized by surfactants. Water soluble polymers such a polyacrylamide are effective in papermaking to improve drainage, formation and retention. Fast drainage and greater retention of fines contribute to lower cost. In addition, they are useful in the flocculation of suspended solids, such as sewage sludge and in the thickening of cellulosic paper pulp suspensions. The increasing cost of materials has made it highly desirable to produce flocculating agents which produce higher separation at lower dose levels. Finally, they are used in enhanced oil recovery processes as drive fluids to push through underground oil reservoirs.

Polymerization of monomers in emulsions is well known to those skilled in the art. Polymers produced by these techniques have found widespread industrial application. Further, some of the techniques described in the literature disclose a variety of multi-stage addition techniques for use in emulsion polymerization methods. Typically, the prior art emulsion disclosures teach adding the second stage as an emulsion and have high aqueous content or no oil.

The Rohm and Haas product literature entitled "Emulsion Polymerization of Acrylic Monomers" pp. 7, 14–18, teaches multi-stage emulsion polymerization of ethyl acrylate to achieve higher solids (43–46%) and to control heat. However, the reference discloses polymerization in an aqueous emulsion with the later steps comprising further addition of the aqueous emulsion.

Naidus, "Emulsion Polymers for Paints," Industrial and Engineering Chemistry, v. 45, n. 4 (1953), discusses adding monomer, or monomer in an aqueous emulsion, continuously during the polymerization to provide a homogeneous composition. The author teaches that the monomer addition technique gives emulsions of smaller aqueous droplet size because of a larger emulsifier to monomer ratio; and that the monomer emulsion addition technique is more stable with less coagulum since adequate emulsification is not dependent upon the agitation.

Taft, U.S. Pat. No. 3,297,621, teaches a two step emulsion polymerization process to control heat wherein the first step comprises adding nonemulsified monomer to a reactor containing catalyst and an emulsifying solution and the second step comprises adding an aqueous emulsion of monomer to the reactor.

Morgan, "Multifeed Emulsion Polymers," J Appl. Polymer Sci., v. 27, 2033–42 (1982), teaches a two stage emulsion to form core/shell concept macroemulsions. The author teaches a first step of continuously adding monomer to surfactant and water; and a second step of adding monomer as a water-in-oil emulsion to minimize destabilization of the seed polymer. The changing of the feed from monomer to water-in-oil emulsion may cause HLB problems.

Robinson et al., U.S. Pat. No. 5,110,864, teach a cationic monomer delayed addition process to produce a polymer having improved retention properties vis-a-vis polymers produced in a comparable one-step process. The disclosed monomers are cationic although acrylamide and acrylic acid are mentioned as comonomers. The patentees teach adding a portion of the monomer containing aqueous phase to the oil phase, emulsifying, adding the remaining portion of the aqueous phase without polymerization, and then polymerizing.

Also known in the art is the use of inverse microemulsion polymerization techniques. The mechanism and reaction kinetics in inverse microemulsions are different than those observed in inverse emulsions. The formation of microemulsions is considerably more complex than the formation of emulsions. Inverse emulsions typically contain 1–10 micron droplets and size grows continuously. The microemulsion polymerization techniques of the prior art are either one-step processes or add the second portion as an emulsion and require a relatively high surfactant and oil content and in some cases disclose a transparent monomer microemulsion.

Candau et al., U.S. Pat. No. 4,521,317, teach a process for polymerizing a water soluble monomer in a water-in-oil inverse microemulsion. The patentees teach that the monomer emulsion is a transparent microlatice and that the aqueous phase comprises 1–50 percent by weight of the total.

Durand et al., U.S. Pat. No. 4,681,912, teach a process to manufacture inverse microlatices of water soluble copolymers by admixing an aqueous phase containing water-soluble monomer and an oil phase with non-ionic surfactant(s) having an HLB range of 8–11 to form a transparent monomer microemulsion and polymerizing. The patentees teach determining the minimum surfactant concentration according to the formula: $y = 5.8x^2 - 110x + 534$ where $x = $ HLB value and $y = $ surfactant concentration.

Holtzscherer et al., "Application of the Cohesive Energy Ratio Concept (CER) to the Formation of Polymerizable Microemulsions," Colloids and Surfaces, 29 (1988), discuss the use of the cohesive energy concept to determine the most efficient use of surfactants in microemulsions. The minimum surfactant content found was 10.8 percent and an optimum HLB of 8.68. Monomer content was 14–22.5 weight percent.

Dauplaise et al., U.S. Pat. No. 4,954,538, teach cross-linked glyoxylated (meth)acrylamides prepared using inverse microemulsion techniques which are disclosed to be useful as wet- and dry- strength agents in paper production.

Honig et al., EP 0 462 365, discuss the use of ionic organic microemulsions to provide improved products useful in drainage and retention in papermaking processes.

Holtzscherer et al., "Modification of Polyacrylamide Microlatices By Using A Seeding Procedure," and Holtzscherer et al., K. L. Mittal and P. Bothorel, eds. Surfactants in Solution, in press, teach a seeding procedure applied to inverse acrylamide microlatices to increase polymer content. Higher solid contents are desirable in most industrial applications. However, the acrylamide is precipitated after the first step. The polymer content is 2.02–4.38 weight percent after the first step and 8.22–10.29 weight percent at final. In addition, the oil phase is 88–92 weight percent.

While the prior art microemulsion processes have provided improvements in the performance of the polymeric products, there still exists a need in the art for further improvement. The amounts of oil and emulsifier employed in the prior art processes are relatively high, thereby making the products more costly.

It is therefore an object of the present invention to produce water-in-oil microemulsions with smaller aqueous phase droplet size using equivalent surfactant and oil content or to produce water-in-oil microemulsions with equivalent polymer phase droplet sizes using significantly less surfactant. The multistep emulsion products also have superior performance as retention aids, in sludge dewatering and as oil recovery drive fluids compared to polymer products of a one-step microemulsion.

SUMMARY OF THE PRESENT INVENTION

According to the present invention, there is provided a method for preparing cross-linked or non-cross-linked polymeric microemulsions, the method comprising (i) preparing an oil phase comprising at least one hydrocarbon liquid and an effective amount of a surfactant or mixture of surfactants; (ii) preparing an aqueous solution comprising at least one monomer which can be anionic, cationic or nonionic, and optionally at least one cross-linking agent; and (iii) adding the aqueous solution in at least two parts to the oil phase and effecting polymerization after each addition.

Preferably, the polymer phase droplets have a number average size diameter of less than about 750 nm, preferably less than about 300 nm, a solution viscosity of at least about 1.1, preferably from about 1.5 to about 4.0 mPa's and a cross-linking agent content of above about 4 molar parts per million, based on the monomeric units present in the polymer. When used as flocculants, it is preferred that the anionic systems have a solution viscosity of about 3.0–7.0, the cationic systems have a solution viscosity of about 1.8–4.5, and the non-ionic systems have a solution viscosity of about 3.0–6.0 mPas. Anionic systems used in oil recovery applications should have a solution viscosity of 2.0–8.0 mPas.

Other preferred features of the present invention comprise compositions, as defined above, wherein the cross-linking agent content ranges from about 4 to about 6000 molar parts per million, preferably from about 10 to about 4000 molar parts per million and even more preferably from about 50 to about 4000 molar parts per million.

The preferred cross-linking agents comprise difunctional monomers selected from N,N'-methylenebisacrylamide; N,N'-methylenebismethacrylamide; polyethyleneglycol diacrylate; polyethyleneglycol dimethacrylate; N-vinylacrylamide; glycidyl acrylate; divinylbenzene; acrolein; glyoxal; diepoxy compounds; epichlorohydrin; or mixtures of any of the foregoing. Especially preferred is N,N'-methylenebisacrylamide.

The preferred anionic monomers are ethylenically unsaturated monomers selected from acrylic acid, methyl acrylic acid and their salts, 2-acrylamido-2-methyl propane sulfonate, sulfoethyl acrylate, sulfoethyl methyl acrylate, vinylsulfonic acid, styrene sulfonic acid, maleic acid and the like. Especially preferred is acrylic acid.

A preferred feature of the present invention comprises a process employing an aqueous solution comprising acrylic acid as the anionic monomer, methylenebisacrylamide as the crosslinking agent and acrylamide as the non-ionic monomer; an oil phase comprising a saturated hydrocarbon and a surfactant comprising a polyoxyethylene sorbitan hexaoleate and a sorbitan sesquioleate sufficient to produce polymer phase droplets of less than about 750 nm number average size diameter.

Polymerization may be effected by adding a polymerization initiator, such as sodium metabisulfite or tert-butyl hydroperoxide to the aqueous phase or oil phase; and adding a polymerization activator while adding the aqueous phase to the oil phase. Alternatively, polymerization may be effected by ultraviolet irradiation.

Also contemplated by the present invention is adding an effective amount of chain-transfer agent to the aqueous solution, such as an alcohol; a mercaptan; a phosphite; a sulfite or a mixture of any of the foregoing. Further, the process of the present invention may also comprise a step for recovering the composition from the inverse microemulsion.

DETAILED DESCRIPTION OF THE PRESENT INVENTION

The present invention provides a method for preparing a polymer microemulsion having smaller aqueous phase droplet sizes comprising (a) preparing an oil phase comprising: (i) at least one hydrocarbon; and (ii) an effective amount of a surfactant or mixture of surfactants to form a microemulsion upon the addition of an aqueous phase; (b) preparing an aqueous phase comprising: (i) at least one ethylenically unsaturated monomer; (c) adding a portion of said aqueous phase (b) to said oil phase (a) to form a microemulsion and polymerizing; and (d) adding another portion of said aqueous phase (b) to the product of step (c) to form a microemulsion and polymerizing; wherein the aqueous polymer phase droplets produced by said method are smaller than those obtained by a method comprising a single addition of the same total amount of aqueous phase and the resultant polymer microemulsion has 1) a polymer solids content of less than about 25% by weight based on the total weight of aqueous phase and oil phase and 2) an emulsifier to monomer ratio (E/M) of less than about 0.4.

The selection of the organic phase has a substantial effect on the minimum surfactant concentration necessary to obtain the inverse microemulsion. This organic phase may comprise a hydrocarbon or hydrocarbon mixture. Saturated hydrocarbons or mixtures thereof are the most suitable in order to obtain inexpensive formulations. Typically, the organic phase will comprise benzene, toluene, fuel oil, kerosene, odorless mineral spirits and mixtures of any of the foregoing.

The one or more surfactants are selected in order to obtain an HLB (Hydrophilic Lipophilic Balance) value ranging from about 8 to about 11. Outside this range, inverse microemulsions are not usually obtained. In addition to the appropriate HLB value, the concentration of surfactant must also be adjusted, i.e., sufficient to form an inverse microemulsion. Too low a concentration of surfactant leads to inverse emulsions of the prior art and too high a concentration results in undue costs. Typical surfactants useful in the practice of this invention, in addition to those specifically discussed above, may be anionic, cationic or non-ionic, and may be selected from polyoxyethylene (20) sorbitan trioleate, polyoxyethylene sorbitol hexaoleate, sorbitan sesquioleate, sorbitan trioleate, sodium di-2-ethylhexylsulfosuccinate, oleamidopropyldimethylamine; sodium isostearyl-2-lactate and the like.

The aqueous phase (ii) comprises an aqueous mixture of the monomers, and, optionally, the crosslinking agent. The aqueous monomer mixture may also comprise such conventional additives as are desired. For example, the mixture may contain chelating agents to remove polymerization inhibitors, pH adjusters, thermal and redox initiators such as peroxides, organic compounds and redox couples, and other conventional additives.

Cationic monomers useful in the practice of the present invention include diallyldimethylammonium chloride; acryloxyethyltrimethylammonium chloride; (meth)acrylates of dialkylaminoalkyl compounds, and salts and quaternaries thereof and, in particular, monomers of N,N-dialkylaminoalkyl(meth)acrylamides, and salts and quaternaries thereof, such as N,N-dimethylaminoethylacrylamides; (meth)acrylamidopropyltrimethylammonium chloride and the acid or quaternary salts of N,N-dimethylaminoethylacrylate and the like. Other cationic monomers which may be used herein are of the following general formulae:

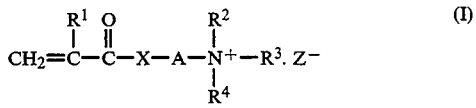

where $R^1$ is hydrogen or methyl, $R^2$ is hydrogen or lower alkyl of $C_1$ to $C_4$, $R^3$ and $R^4$ are the same or different and independently represent hydrogen, alkyl or $C_1$ to $C_{12}$ aryl, or hydroxyethyl and $R^2$ and $R^3$ or $R^2$ and $R^4$ can combine to form a cyclic ring containing one or more hetero atoms, Z is the conjugate base of an acid, X is oxygen or $-NR^1$ wherein $R^1$ is independently as defined above, and A is an alkylene group of $C_1$ to $C_{12}$; or

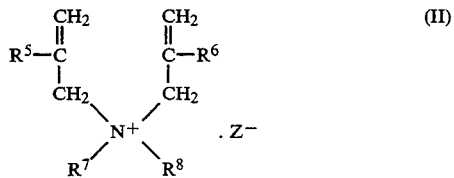

where $R^5$ and $R^6$ are the same or different and independently represent hydrogen or methyl, $R^7$ is hydrogen or alkyl of $C_1$ to $C_{12}$ and $R^8$ is hydrogen, alkyl of $C_1$ to $C_{12}$, benzyl or hydroxyethyl; and Z is as defined above.

Non-ionic monomers suitable for use in the practice of the present invention generally comprise acrylamide; methacrylamide; N-alkylacrylamides, such as N-methylacrylamide; N,N-dialkylacrylamides, such as N,N-dimethylacrylamide; methyl acrylate; methyl methacrylate; hydroxyalkyl(meth)acrylates; acrylonitrile; N-vinyl methylacetamide; N-vinyl methyl formamide; N-vinyl pyrrolidone, mixtures of any of the foregoing and the like.

The present invention further contemplates copolymerizing ionic and non-ionic monomers to produce ionic copolymers. Illustratively, acrylamide can be copolymerized with an anionic monomer such as acrylic acid. Anionic copolymers useful in the practice of the present invention comprise from about 1 to about 99 parts by weight of non-ionic monomer and from about 99 to about 1 part by weight anionic monomer based on 100 total parts by weight of the anionic and non-ionic monomer taken together; preferably from about 30 to about 99 parts by weight non-ionic monomer and from about 1 to about 70 parts by weight of anionic monomer, same basis. Alternatively, cationic copolymers can be prepared in similar manner.

Polymerization of the monomers optionally occurs in the presence of a polyfunctional cross-linking agent to form a cross-linked composition. The polyfunctional cross-linking agent comprises molecules having either at least two double bonds, a double bond and a reactive group, or two reactive groups or mixtures thereof.

Polyfunctional branching agents containing at least one double bond and at least one reactive group include glycidyl acrylate; glycidyl methacrylate; acrolein; methylolacrylamide, mixtures thereof and the like.

Polyfunctional branching agents containing at least two reactive groups include dialdehydes, such as glyoxal; diepoxy compounds; epichlorohydrin, mixtures thereof and the like.

A variety of thermal and redox free-radical initiators including azo compounds, such as azobisisobutyronitrile; peroxides, such as t-butyl peroxide; inorganic compounds, such as potassium persulfate; and redox couples, such as ferrous ammonium sulfate/ammonium persulfate, may also be added to the aqueous phase, or to the oil phase.

The method of the present invention proceeds by incrementally adding the aqueous phase to the oil phase in at least two parts, and effecting polymerization after each addition of aqueous phase i.e. there may be n incremental addition/polymerization stages wherein n ranges from 2-10 inclusive. The aqueous phase may be added in substantially equal parts such as halves, thirds, fourths, etc., or the aqueous phase may be added in a dropwise manner to the oil phase. It is further contemplated by the method of the present invention that the aqueous phase additions are added in non-equal parts, as long as there is sufficient monomer in each part to form a microemulsion with the oil phase and obtain the benefits of the present invention.

Preferably, the polymerization is effected by the addition of a polymerization activator, such as sulfur dioxide. Alternatively, polymerization may also be effected by photochemical irradiation processes, irradiation, or by ionizing radiation with a $^{60}Co$ source.

Recovery of the polymer from the microemulsion, if desired, may be effected by inversion of the resulting microemulsion by adding it to water which may contain a breaker surfactant. Optionally, the polymer may be recovered from the microemulsion by stripping or by adding the microemulsion to a solvent which precipitates the polymer, e.g., isopropanol, filtering off the resultant solids, drying and redispersing in water.

The polymer products of this invention are useful in facilitating a wide range of solid-liquid separation operations. They may be used to dewater biologically treated suspensions, such as sewage and other municipal or industrial sludges; to drain cellulosic suspensions, such as those found in paper production, e.g., paper waste; and to settle and dewater of various inorganic suspensions, e.g., refinery waste, coal waste, etc. For example, a method of flocculation can comprise adding the cationic polymeric flocculants of the present invention to an aqueous dispersion of suspended solids, such as sewage sludge, in amounts ranging from about 0.1 to about 50,000 ppm by weight of dispersion and then separating the flocculated suspended solids from the dispersion.

The anionic and cationic polymers of the present invention are especially useful as a retention aid to conventional papermaking stock such as chemical pulps, mechanical pulps, thermomechanical pulps or recycled pulps.

The anionic polymers of the present invention are especially useful in oil recovery methods such as in drive fluids, manufacture of drilling muds, ground consolidation, prevention of inflows in producing oil wells and as completion or fracturation fluids.

DESCRIPTION OF THE PREFERRED EMBODIMENTS

The following examples illustrate the present invention. They are not to be construed to limit the claims in any manner whatsoever except as set forth therein.

COMPARATIVE EXAMPLE 1A

An oil phase is preparedly adding 90 grams of low odor paraffin oil to a suitable vessel. Surfactants, 0.61 g of sorbitan sesquioleate (SS) and 9.39 grams of polyoxyethylene sorbitol hexaoleate (POSH) are then added to the oil. The mixture is stirred until homogeneous.

The aqueous phase is then prepared by cooling a solution of 31.74 grams of 50% aqueous solution acrylamide and 30.79 grams of deionized water. Then 24.13 grams of acrylic acid are slowly added followed by the addition of 12.8 grams of sodium hydroxide. Next, 0.08 gram of methylenebisacrylamide, 0.40 gram of t-butyl hydroperoxide (70% aqueous) and 0.06 gram of pentasodium diethylenetriamine pentaacetate (40% solution) are added. The pH is adjusted to 7.0±0.1 using sodium hydroxide.

The aqueous phase is then slowly added to the oil phase with agitation. The vessel is sparged with nitrogen for 15 minutes. Sulfur dioxide is generated by passing nitrogen through an aqueous solution of sodium metabisulfite (0.5%). The resulting stream is bubbled through the emulsion during monomer addition.

The aqueous phase/oil phase ratio (A/O) is 1/1 and the emulsifier/monomer ratio (E/M) is 0.25. The monomer emulsion is milky in appearance and the polymer emulsion is very clear and stable. The polymer solids is 20%.

Polymer phase droplet size distributions are obtained with a Nicomp Model HN5-90 Laser Scattering Spectrophotometer, a Nicomp Autocorrelator Model TC 100, using a Cu Radiation PS2 5 mW Helium-Neon Laser.

Drainage is tested by the Britt-Jar Method using a Britt CF Dynamic Drainage Jar packed with alum and varying ratios of retention aid and polymer.

EXAMPLE 1

The oil phase and aqueous phases are prepared as set forth in Comparative Example 1.

However, the aqueous phase is added to the oil phase in 3 equal parts by the following procedure. One third of the aqueous phase is added to form a hazy emulsion, the reaction is sparged with nitrogen, and SO$_2$ is bubbled through the mixture. The acrylic acid/acrylamide ratio is 60/40. The A/O ratio is 0.33 and the E/M ratio is 0.75. The polymerization is then quenched with oxygen by bubbling air through the emulsion for 1 minute. The polymer emulsion is stable and very clear. This sequence is then repeated two more times.

After the second step, the A/O is 0.67 and the E/M is 0.38. The resultant emulsion is stable and very clear.

After the third step, the A/0 is 1/1 and the E/M is 0.25. The resultant emulsion is stable and very clear. The polymer solids content thereof is 20%.

COMPARATIVE EXAMPLE 2A

The procedure of Comparative Example 1A is repeated without the addition of methylenebisacrylamide. The resulting polymer emulsion (polymer solids=20%) is stable and very clear.

EXAMPLE 2

The procedure of Example 1 is repeated without the addition of methylenebisacrylamide. The resulting polymer emulsion is stable, very clear and has a polymer solids content of 20%.

COMPARATIVE EXAMPLE 3A

The procedure of Comparative Example 1A is repeated except that 0.112 gram of methylenebisacrylamide is employed. The resulting emulsion is stable and very clear. Polymer solids content is again 20%.

EXAMPLE 3

The procedure of Example 1 is repeated except that 0.112 gram of methylenebisacrylamide is employed. The resulting emulsion (polymer solids=20%) is stable and very clear.

COMPARATIVE EXAMPLE 4A

The procedure of Comparative Example 1A is repeated except that it contains 86 grams of oil, 0.86 gram of SS and 13.14 grams of POSH.

The A/O ratio is 1/1 and the E/M ratio is 0.35. The resulting emulsion is stable and very clear and has a polymer solids content of 20%.

EXAMPLE 4

The procedure of Example 1 is repeated except that it contains 86 grams of oil, 0.86 gram of SS and 13.14 grams of POSH.

The A/O ratio for the first step is 0.33 and the E/M ratio is 1.05. The A/O ratio for the second step is 0.67 and the E/M ratio is 0.58. The A/O ratio for the third step is 1/1 and the E/M ratio is 0.35.

The resulting emulsion is stable and very clear. Its polymer solids content is 20%.

COMPARATIVE EXAMPLE

The procedure of Comparative Example 1A is followed except that it contains 84 grams of oil, 0.98 gram of SS and 15.02 grams of POSH. The A/O ratio is 1/1 and the E/M ratio is 0.4. The resulting emulsion is stable and very clear, with a polymer solids content of 20%.

EXAMPLE 5

The procedure of Example 1 is followed except that it contains 84 grams of oil, 0.98 gram of SS and 15.02 grams of POSH.

The A/O ratio for the first step is 0.33 and the E/M ratio is 1.2. The A/O ratio for the second step is 0.67 and the E/M ratio is 0.8. The A/O ratio for the third step is 1/1 and the E/M ratio is 0.4.

The resulting emulsion is stable and very clear, having a polymer solids content of 20%.

COMPARATIVE EXAMPLE 6A

The procedure of Comparative Example 5A is followed except that the aqueous phase comprises 16.09 grams of acrylic acid, 21.16 grams of acrylamide, 8.53 grams of sodium hydroxide, 0.053 gram of methylenebisacrylamide, 0.27 gram of t-butylhydroperoxide, 0.04 gram of sodium diethylenetriamine pentaacetate, and 20.53 grams of water.

The A/O ratio is 1/1 and the E/M ratio is 0.6. The resulting emulsion is stable and very clear. The polymer solids content is 13.3%.

EXAMPLE 7

The procedure of Example 6B is repeated except that the oil phase comprises 90.0 grams of oil, 0.61 gram of SS and 9.39 grams of POSH.

The A/O ratio of the first step is 0.5 and the E/M ratio is 0.76. The A/O ratio of the second step is 1/1 and the E/M ratio is 0.38. The resulting emulsion is stable and very clear. The polymer solids content thereof is 13.3%.

The compositions of Examples 1–7 and Comparative Examples 1A–7A are tested for polymer phase droplet size and drainage rates. The results, along with compositional data, are set forth below in Table 1.

TABLE 1

| EXAMPLE | 1A* | 1 | 2A* | 2 | 3A* | 3 | 4A* | 4 | 5A* | 5 | 6A* | 6B* | 7A* | 7 |
|---|---|---|---|---|---|---|---|---|---|---|---|---|---|---|
| Composition, grams | | | | | | | | | | | | | | |
| Oil$^a$ | 90 | 90 | 90 | 90 | 90 | 90 | 86 | 86 | 84 | 84 | 84 | 84 | 90 | 90 |
| SS$^b$ | 0.61 | 0.61 | 0.61 | 0.61 | 0.61 | 0.61 | 0.86 | 0.86 | 0.98 | 0.98 | 0.98 | 0.98 | 0.98 | 0.98 |
| POSH$^c$ | 9.39 | 9.39 | 9.39 | 9.39 | 9.39 | 9.39 | 13.14 | 13.14 | 15.02 | 15.02 | 15.02 | 15.02 | 9.39 | 9.39 |
| Acrylamide$^d$ | 31.74 | 31.74 | 31.74 | 31.74 | 31.74 | 31.74 | 31.74 | 31.74 | 31.74 | 31.74 | 21.16 | 21.16 | 21.16 | 21.16 |
| Water | 30.79 | 30.79 | 30.79 | 30.79 | 30.79 | 30.79 | 30.79 | 30.79 | 30.79 | 30.79 | 20.53 | 20.53 | 20.53 | 20.53 |
| Acrylic Acid | 24.13 | 24.13 | 24.13 | 24.13 | 24.13 | 24.13 | 24.13 | 24.13 | 24.13 | 24.13 | 16.09 | 16.09 | 16.09 | 16.09 |
| Sodium Hydroxide | 12.8 | 12.8 | 12.8 | 12.8 | 12.8 | 12.8 | 12.8 | 12.8 | 12.8 | 12.8 | 8.53 | 8.53 | 8.53 | 8.53 |
| MBA$^e$ | 0.08 | 0.08 | 0.0 | 0.0 | 0.08 | 0.112 | 0.08 | 0.112 | 0.08 | 0.08 | 0.053 | 0.053 | 0.053 | 0.053 |
| TBHP$^f$ | 0.40 | 0.40 | 0.40 | 0.40 | 0.40 | 0.40 | 0.40 | 0.40 | 0.40 | 0.40 | 0.27 | 0.27 | 0.27 | 0.27 |
| DPTA$^g$ | 0.06 | 0.06 | 0.06 | 0.06 | 0.06 | 0.06 | 0.06 | 0.06 | 0.06 | 0.06 | 0.04 | 0.04 | 0.04 | 0.04 |
| Steps, # | 1 | 3 | 1 | 3 | 1 | 3 | 1 | 3 | 1 | 3 | 1 | 2 | 1 | 2 |
| Final E/M$^h$ | 0.25 | 0.25 | 0.25 | 0.25 | 0.25 | 0.25 | 0.35 | 0.35 | 0.4 | 0.4 | 0.6 | 0.6 | 0.38 | 0.38 |
| MBA$^i$, ppm | 2000 | 2000 | 0 | 0 | 2800 | 2800 | 2000 | 2000 | 2000 | 2000 | 2000 | 2000 | 2000 | 2000 |
| Properties | | | | | | | | | | | | | | |
| Droplet Size, nm | 157 | 135 | 152 | 128 | 141 | 137 | 129 | 122 | 113 | 110 | 109 | 114 | 127 | 119 |
| Drainage, sec | | | | | | | | | | | | | | |
| 0.013$^j$ | 56.9 | 47.7 | — | — | 61.9 | 59.6 | 57.2 | 57.2 | 57.0 | 55.8 | — | — | — | — |
| 0.015$^j$ | 51.8 | 46.5 | — | — | 47.9 | 45.7 | 49.2 | 49.2 | 54.9 | 46.0 | — | — | — | — |
| 0.025$^j$ | 43.5 | 40.9 | — | — | — | — | 44.0 | 42.8 | 43.3 | 42.5 | — | — | — | — |

\* = comparative example
$^a$ = Low odor paraffin oil
$^b$ = Sorbitan Sesquioleate
$^c$ = Polyethylene Sorbitol Hexaoleate
$^d$ = 50% Aqueous solution
$^e$ = Methylenebisacrylamide
$^f$ = 70% Aqueous t-butyl hydroperoxide
$^g$ = 40% Aqueous solution of pentasodium diethylenetriamine pentaacetate
$^h$ = Emulsifier to Monomer ratio of final microemulsion
$^i$ = Cross-linker level on monomer in parts per million
$^j$ = % dose, polymer

COMPARATIVE EXAMPLE 6B

The components of Comparative Example 6A are employed. However, the polymerization is effected by adding the aqueous phase in two equal parts by the following procedure. One-half of the aqueous monomer phase is added to the oil phase to form a hazy monomer emulsion and the vessel is sparged with nitrogen and S02 is bubbled through the reaction mixture. The polymerization is quenched with oxygen by bubbling air for 1 minute. The sequence is then repeated.

The A/O ratio after the first step is 0.5 and the E/M ratio is 1.2. The A/O ratio after the second step is 1/1 and the E/M ratio is 0.6.

The resulting emulsion is stable and very clear, with a polymer solids content of 13.3%.

COMPARATIVE EXAMPLE 7A

The procedure of Comparative Example 6A is repeated except that the oil phase comprises 90.0 grams of oil, 0.61 gram of SS and 9.39 grams of POSH.

The A/O ratio is 1/1 and the E/M ratio is 0.38. The resulting emulsion is stable and very clear. Its polymer solids content is 13.3%.

The improvements of the present invention can be seen from the data of Table 1. The droplet sizes of the polymer phases produced in accordance with the present invention, multi-step additions, are smaller and provide improved drainage. Note, from Examples 3–3A and 4–4A, that the level of cross-linker has little effect on polymer phase droplet size.

The terms "emulsifier to monomer ratio" or "E/M", as used herein, is meant to indicate the total amount of monomer added during the preparation of the polymer microemulsion i.e. the amount which is added in each individual stage of aqueous phase addition plus that which had been added previous to any such stage. With respect to the final microemulsion, the term refers to the ratio of emulsifier to polymer i.e. polymerized monomer.

The above-mentioned patents and publications are hereby incorporated by reference.

Many variations of the present invention will suggest themselves to those skilled in this art in light of the above-detailed description. Anionic monomers other than acrylic acid can be employed, as can non-ionic monomers other than acrylamide. Further, cationic monomers can readily be employed. Polymerization can also be effected by UV-radiation. Chain transfer agents may be optionally added to the monomer solution. All such obvious modifications are within the full intended scope of the appended claims.

I claim:

1. A method of preparing water-in-oil polymer microemulsions having small aqueous phase droplet sizes comprising:
   (a) preparing an oil phase comprising:
      (i) at least one hydrocarbon; and
      (ii) an effective amount of a surfactant or mixture of surfactants to form a microemulsion upon the addition of an aqueous phase;
   (b) preparing an aqueous phase comprising:
      (i) at least one ethylenically unsaturated monomer;
   (c) adding a portion of said aqueous phase (b) to said oil phase (a) to form a microemulsion and polymerizing; and
   (d) adding another portion of said aqueous phase (b) to the product of step (c) to form a microemulsion and polymerizing so as to form a polymer microemulsion having a polymer solids content of less than about 25% and an emulsifier to monomer ratio of less than about 0.4,
   wherein the aqueous polymer phase droplets produced by said method are smaller than those obtained by a method comprising a single addition of the same total amount of aqueous phase.

2. A method as defined in claim 1 wherein said ethyenically unsaturated monomer comprises an anionic monomer.

3. A method as defined in claim 1 wherein said ethylenically unsaturated monomer comprises a cationic monomer.

4. A method as defined in claim 1 wherein said ethylenically unsaturated monomer comprises a non-ionic monomer.

5. A method as defined in claim 1 further comprising adding a cross-linking monomer to said aqueous phase.

6. A method as defined in claim 1 wherein said portions of said aqueous phase are substantially equal.

7. A method as defined in claim 1 wherein steps (c) and (d) comprise two or more incremental additions of portions of aqueous (b) to said oil phase (a) with polymerization after each incremental addition.

8. A method as defined in claim 7 wherein there are "n" incremental addition/polymerization stages wherein n ranges from 2 to 10.

9. A method as defined in claim 7 wherein said incremental addition/polymerization stages are performed in dropwise increments.

* * * * *